(12) United States Patent
Lin et al.

(10) Patent No.: US 6,776,884 B2
(45) Date of Patent: Aug. 17, 2004

(54) ELECTROPOLISHING PROCESS MEANS FOR INNER AND OUTER SURFACES OF A METAL

(75) Inventors: Chun-Hung Lin, I-Lan (TW);
Chin-Ching Wu, Hsinchu (TW);
Yun-Sheng Chung, Hsinchu (TW);
Chin-Jyi Wu, KaoHsiung (TW);
Yung-Chen Peng, Hsinchu (TW);
Yu-Chuan Tu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 241 days.

(21) Appl. No.: 10/076,308

(22) Filed: Feb. 19, 2002

(65) Prior Publication Data

US 2003/0106792 A1 Jun. 12, 2003

(30) Foreign Application Priority Data

Dec. 6, 2001 (TW) .................................... 90221204 U

(51) Int. Cl.[7] .................. C25D 17/00; C25C 7/00; C25B 15/00

(52) U.S. Cl. .................. 204/224 M; 204/272; 204/241; 204/237; 204/267

(58) Field of Search .................. 204/224 M, 272, 204/241, 237, 267, 269

(56) References Cited

U.S. PATENT DOCUMENTS 6,599,415 B1 * 7/2003 Ku et al. .................... 205/670

* cited by examiner

Primary Examiner—Patrick Ryan
Assistant Examiner—Thomas H. Parsons
(74) Attorney, Agent, or Firm—Troxell Law Office PLLC

(57) ABSTRACT

An electropolishing device having: an electrode device, which includes a positive electrode guide, a negative electrode guide, a positive electrode plate, a negative electrode plate and a negative working electrode; a clamping apparatus, which includes at least an insulated screw, an upper insulated piece and a lower insulated piece; and an insulated structure, which includes an upper insulated cover and a lower insulated cover.

20 Claims, 4 Drawing Sheets

ELECTROPOLISHING PROCESS MEANS FOR INNER AND OUTER SURFACES OF A METAL

FIELD OF THE INVENTION

The present invention is an electropolishing process device for inner and outer surfaces of a metal, more specifically for cleaning and passivation of the inner and outer surfaces of the metal.

BACKGROUND OF THE INVENTION

A process of electropolishing is to connect a workpiece to an anode and a metal to a cathode, aforesaid whole structure of workpiece connecting to anode and electrode connecting to cathode is put into electrolyte for electrifying direct current, thus defects on workpiece surface are removed to produce a surface that is shining and smooth. Benefits of electrolysis and polish improving surface cleanness, roughness, passivation, etc. Industry, such as semiconductor, chemical industry, biochemical engineering, food industry, need tubes to deliver fluids, and inner surfaces of tubes are treated by polish or electrolysis to approach high cleanness and anti-corrosion. Especially, products of IC/LCD/III-V require high standards of cleanness and anti-corrosion, thus, applying the present invention to said products is a challenge.

In prior arts of U.S. Pat. No. 4,826,582 and 4,849,084, which taught a Dart of the technologies for electropolishing a 10-meter heat exchange tube, utilized an electrode device for positioning a workpiece and required sealing an electrolyte. The prior arts adopt a 3-layer structure of delivering electrolyte of high pressure air, but unfortunately said structure is very complicate and only suitable for the larger diameter workpieces, not for the tube of inside diameter under 3 cm.

The prior art of U.S. Pat. No. 5,958,195 taught the technology of electropolishing an inner surface of a long and bent tube. However, to electropolish a bent tube, an electrode must move alone along a curve and prevent short circuit. The most important parts are a flexible electrode and an insulation device. The insulation device is to avoid short circuit and non-concentricity, but this kind of devices block electrolyte flowing and make an un-average electric field. etc.

The prior art of U.S. Pat. Nos. 4,601,802 and 4,705,611, disclose a fixture applied inside a tube, and the fixture stabilizes a plurality of axially rotating tubes simultaneously. An end connector can circulate tube and exhaust gas from an upper end, and electrolyte can be recycled after overflowing. An electrode length is equal to the tube length, therefore a huge space and a super power supplier are needed for such conditions.

Based on the aforesaid issues, the present inventor of the invention has studied and referred to practical experiences and theory to design and effectively improve the prior arts.

SUMMARY OF THE INVENTION

The first object is to offer an electropolishing process means for inner and outer surfaces of a metal, which improves an electrode design and applies theories of macro and micro polishing to an electrode means for improving a manufacturing rate in both smoothing and passivation effect on the surface of workpiece.

The second object is to offer an electropolishing process means for inner and outer surfaces of a metal, which can treat both inside and outside of a workpiece simultaneously, and the workpiece inner diameter is smaller than one inch. The device has a simple structure that will save on equipment cost.

The third object is to offer an electropolishing process means for inner and outer surfaces of a metal, which avoids short circuit and non-concentricity problems. An electrode of the present invention is installed through a center of the workpiece, so the electrode has a certain distance with the inner surface of the workpiece. Therefore, the short circuit and non-concentricity are solved.

The appended drawings will provide further illustration of the present invention, together with description; serve to explain the principles of the invention.

DETAILED DESCRIPTION OF THE PREFERRED EMBODIMENTS

For different fields of semiconductor, pharmaceutical industry, chemical industry, biochemical engineering, food industry, inner surfaces of needed tubes and fitting of aforesaid fields are treated by electropolishing process for improving surface cleanness, roughness and passivation results. The present invention comprises an electrolyte delivering system, which passes electrolyte across both inner and outer surfaces of a metal and the electrolyte is an electrifying media to make a complete electric circuit path. Electrolyte is delivered by the electrolyte delivering system for recycling.

Figure 1:
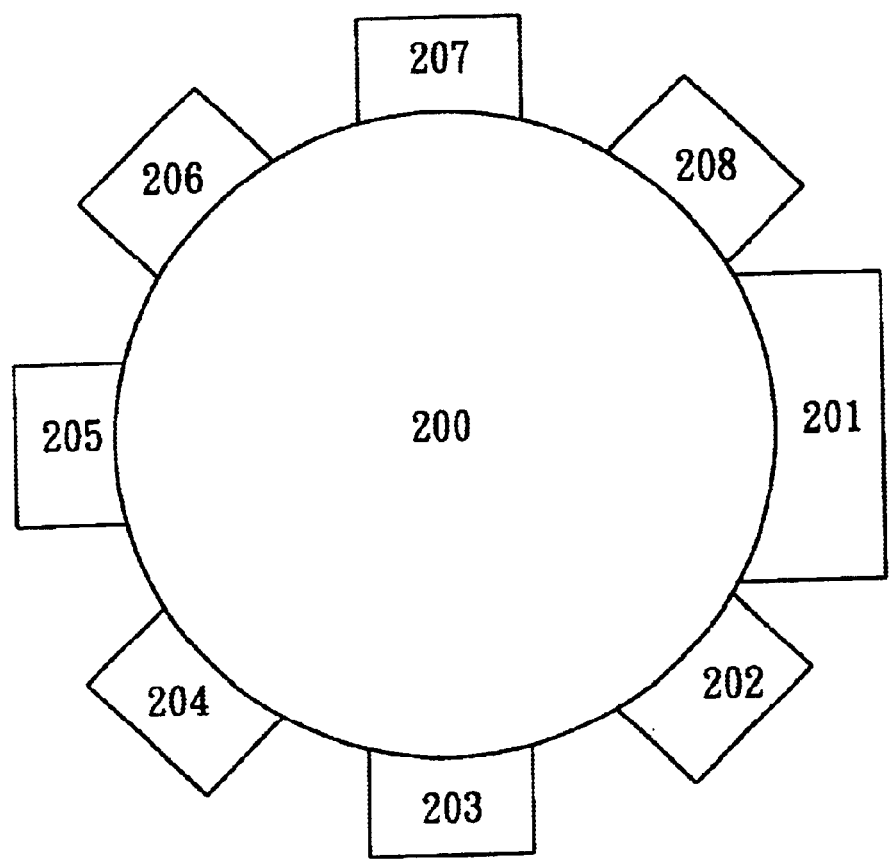
FIG. 1 is a scheme of an electropolishing process equipment of the present invention.

Referring to FIG. 1, which is a scheme of an electropolishing process equipment of the present invention. A revolving stage 200 has a plurality of tanks, which includes two electrolyte polishing tanks 202, 203, two water rinse tanks 204, 206, one nitric acid rinse tank 205, one hot deionization water rinse tank 207 and one drying tank 208. A workpiece (not shown in figure) for polishing is hung up from a loading and unloading area 201, the resolving stage 200 timely controls to rotate the workpiece to each tank. The electrolytic polishing tanks 202, 203 which electrolyte contents are sulfuric acid of 10–50%, phosphoric acid of 50–90%, glycerol of 1–10%, and its temperature is 25–100° C.; nitric acid rinse tank 205 which nitric acid content is 10–40%, and its temperature is 25–90° C. The present invention connects to the revolving stage 200 via an over-hanging beam 209, and the over-hanging beam 209 is a cam mechanism 210 to shake for reducing air bulbs when reaction is being preceded.

Figure 2:
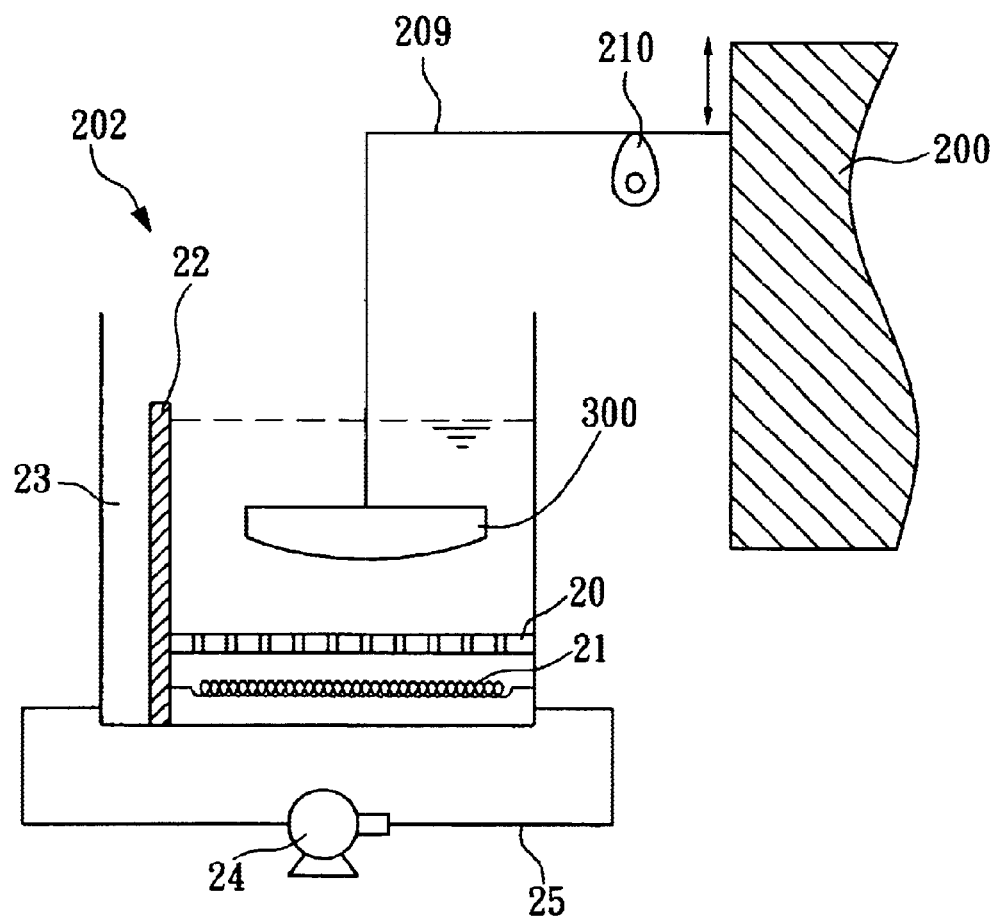
FIG. 2 is a scheme of an electrolytic polishing tank and related equipment of the present invention.

Referring to FIG. 2, which is a scheme of an electrolytic polishing tank and related equipment of the present invention. An electropolishing process means 300 of the present invention is placed in an electropolishing tank 202 for electrochemical reaction. Wherein, the electrolytic polishing tank 202 is the first huge polishing procedure; electrolyte is delivered by an anti-corrosion pump 24 to electrolytic polishing tank 202 from tank bottom, and it is then heated by a heater 21 and flows from lower to upper place of the tank 202 through a meshed plate 20;when electrolyte is up to a certain height, it overflows a partition 22 to a temporary electrolyte storing tank 23 when electrolyte amount is more than tank capacity, and then the pump 24 cooperate with a pipe 25 to recycle electrolyte. The heater 21 is to heat and also has thermal insulation function; the meshed plate 20 is to uniformly distribute electrolyte flow from bottom to upper plate of tank 202. An electropolishing tank 203 Is the second procedure, and the difference between the two electrolytic polishing tanks 202 and 203 is that those two current intensities are different, and the two current intensities are designed to fit the other procedures as well.

Figure 3:
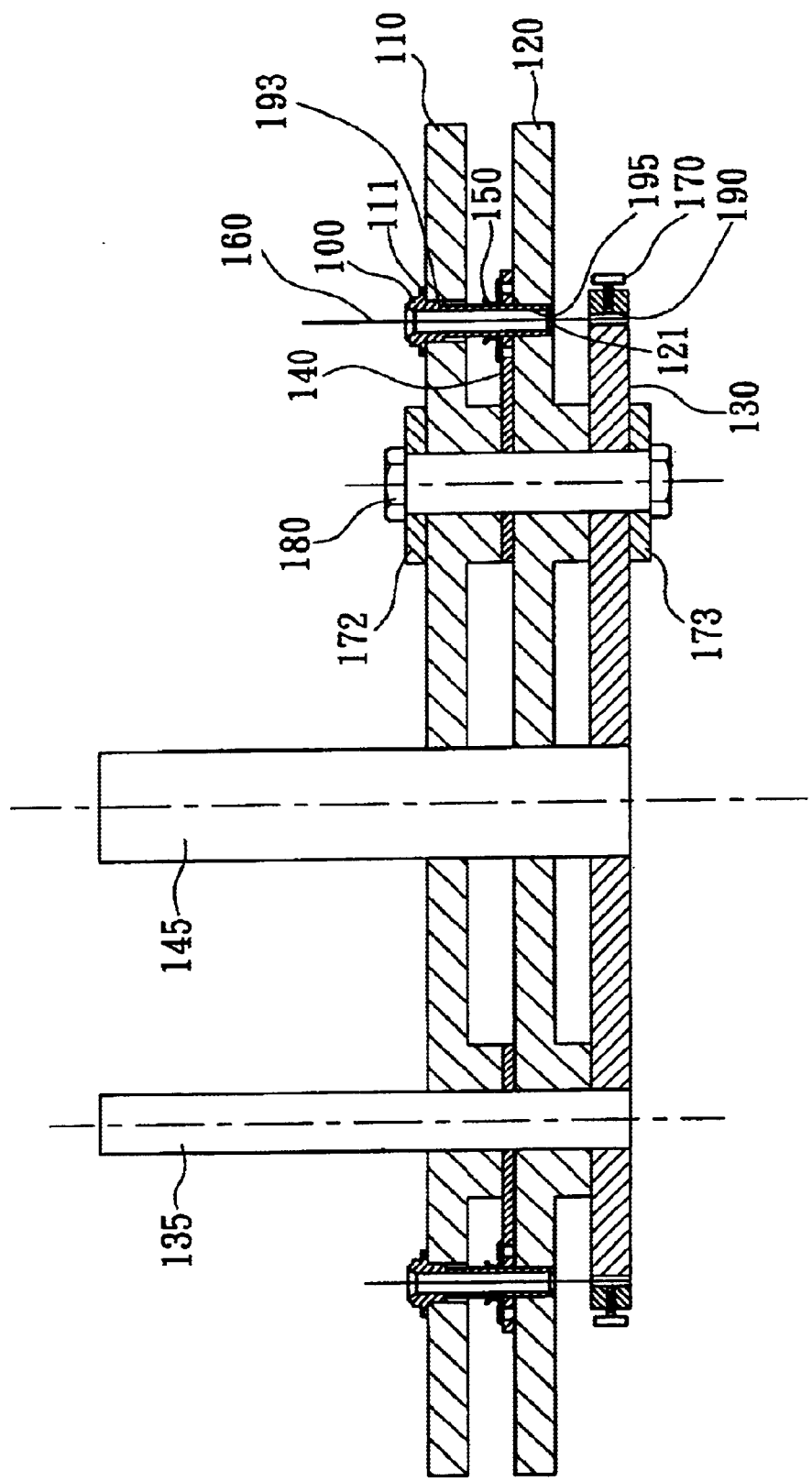
FIG. 3 is a sectional view of a preferred embodiment of the present invention.
Figure 4:
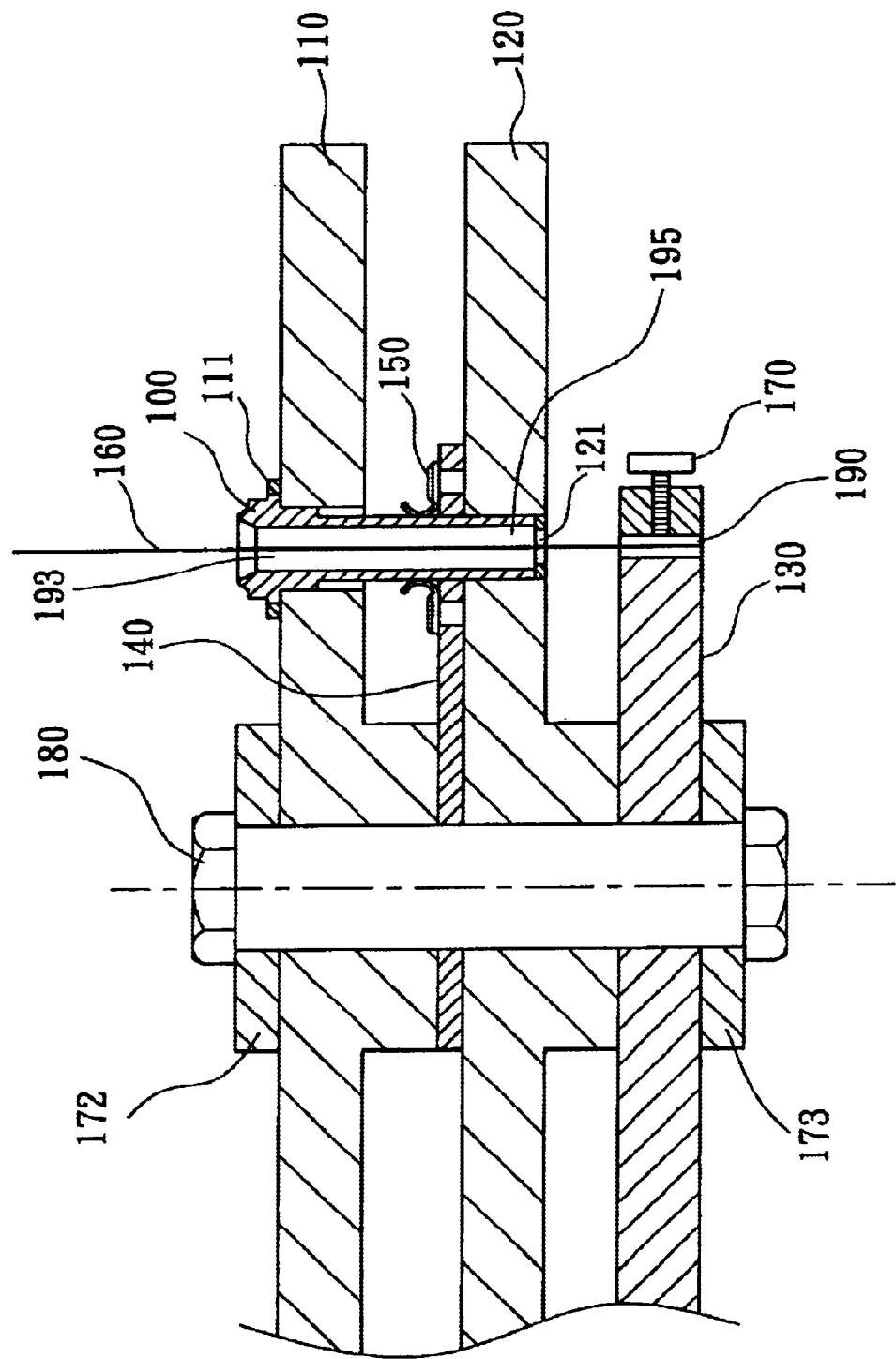
FIG. 4 is an enlarged view of the preferred embodiment of FIG. 3.

Please refer to FIGS. 3 and 4, which are a sectional view of a preferred embodiment of the present invention and an enlarged view of the preferred embodiment of FIG. 3. The embodiment comprises an electrode device, which includes a positive electrode guide 135, a negative electrode guide 145, a positive electrode plate 140, a negative electrode plate 130 and a negative working electrode 160, the positive electrode guide 135 connects to the positive electrode plate 140 and a workpiece 100 for offering a function of positive electrode, the negative electrode guide 145 connects to the negative working electrode 160 via the negative electrode plate 130 for offering a function of negative electrode a connection part of negative electrode plate 130 and negative working electrode 160 has a working electrode hole 190 and a negative electrode fixture 170 for placing and positioning negative working electrode 160, such layout is to offer a negative power source when electrifying; a clamping apparatus, which includes at least one insulated screw 180, one upper insulated piece 172 and one lower insulated piece 173, the insulated screw 180 gets positive electrode plate 140 and negative electrode plate 130 together with an upper insulated cover 110 and a lower insulated plate 120 in between, wherein, negative electrode plate 130 is on a bottom of the lower insulated plate 120, positive electrode plate 140 is between the upper insulated cover 110 and lower insulated plate 120, the upper insulated piece 172 and the lower insulated piece 173 are individually set in two middles of the insulated screw 180 with positive electrode plate 140 and insulated screw 180 with negative electrode plate 130 for preventing electric leakage; an insulated structure, which has aforesaid upper insulated cover 110 and lower insulated cover 120, positive electrode plate 140 Is between upper insulated cover 110 and lower insulated cover 120, upper insulated cover 110 has a first workpiece hole 193 and lower insulated cover 120 has a second workpiece hole 195, an upper inner diameter of the second workpiece hole 195 is bigger and a lower inner diameter 121 is smaller than a diameter of the workpiece 100, the first workpiece hole 193 and the second workpiece hole 195 are concentric because of upper insulated cover 110 perpendicular to lower insulated cover 120, workpiece 100 can then be inserted from first workpiece hole 193 to second workpiece hole 195, workpiece 100 on first workpiece hole 193 of upper insulated cover 110 is added a guard 111 for avoiding electric field affection, because an area protected by the guard 111 has no needs to be electrified and polished; workpiece 100 is placed on top of lower inner diameter 121 for workpiece 100 connecting to lower insulated cover 120, thus the area protected by the guard 111 is not electrified and polished by electric field so as to be easily welded. A working piece fixture 150 is around second workpiece hole 195 to fix workpiece 100 in second workpiece hole 195. The working electrode hole 190, first workpiece hole 193 and second workpiece hole 195 are concentric for negative working electrode 160 going through first workpiece hole 193, second workpiece hole 195 and working electrode hole 190. Positive electrode plate 140, negative electrode plate 130, upper insulated cover 110 and lower insulated cover 120 are parallel each other. Negative working electrode 160 is on an axis of workpiece 100 for offering a function of negative electrode; workpiece 100 plays a role of positive electrode. Depending on a theory of anode half reaction and cathode half reaction, anode loses electrons and cathode receives electrons. Thus, the embodiment has an electrolytic reaction after introducing direct current, and then electropolishing process is approached.

While the present invention has been shown and described with reference to preferred embodiments thereof, and in terms of the illustrative drawings, it should be not considered as limited thereby. Thus, the present invention is infinitely used. However, various possible modification, omission, and alterations could be conceived of by one skilled in the art to the form and the content of any particular embodiment, without departing from the scope and the sprit of the present invention.

The invention is disclosed and is intended to be limited only the scope of the appended claims and its equivalent area.

What is claimed is:

1. An electropolishing process means for inner and outer surfaces of a metal comprising:

an electrode device having a positive electrode guide, a negative electrode guide, a positive electrode plate, a negative electrode plate and a negative working piece, the positive electrode guide connecting to the positive electrode plate for offering a positive power source, the negative electrode guide connecting to the negative working piece via the negative electrode plate for offering a negative power source;

an insulated structure having an upper insulated cover and a lower insulated cover, positive electrode plate being between the upper insulated cover and the lower insulated cover, the negative electrode plate located on a bottom of the lower insulated cover;

a clamping apparatus connecting upper insulated cover, lower insulated cover, positive electrode plate and negative electrode plate together.

2. The electropolishing process means for inner and outer surfaces of a metal as claimed in claim 1, wherein an end of negative electrode plate has an electrode hole for positioning negative working electrode.

3. The electropolishing process means for inner and outer surfaces of a metal as claimed in claim 1, wherein upper insulated cover and lower insulated cover have one straight hole per each, the two straight holes and the electrode hole of negative electrode plate are concentric.

4. The electropolishing process means for inner and outer surfaces of a metal as claimed in claim 1, wherein clamping apparatus comprises an insulated screw to combine upper insulated cover, lower insulated cover, positive electrode plate and negative electrode plate.

5. The electropolishing process means for inner and outer surfaces of a metal as claimed in claim 1, wherein negative working electrode is installed in the two straight holes of upper insulated cover and lower insulated cover and electrode hole of negative electrode plate.

6. The electropolishing process means for inner and outer surfaces of a metal as claimed in claim 1, an end of positive electrode plate has a fastening workpiece apparatus inserted therein for positioning a workpiece in a second workpiece hole.

7. The electropolishing process means for inner and outer surfaces of a metal as claimed in claim 6, wherein the fastening workpiece apparatus adopts a clamping method to fasten workpiece.

8. The electropolishing process means for inner and outer surfaces of a metal as claimed in claim 1, wherein a positive electrode comprises positive electrode plate, positive electrode guide and workpiece.

9. The electropolishing process means for inner and outer surfaces of a metal as claimed in claim 1, wherein a negative electrode comprises negative electrode plate, negative electrode guide and negative working piece.

10. The electropolishing process means for inner and outer surfaces of a metal as claimed in claim 3, wherein bottom of the straight hole of lower insulated cover is smaller diameter for preventing electric field affection, and avoiding bottom of workpiece being electrolyzed and polished.

11. The electropolishing process means for inner and outer surfaces of a metal as claimed in claim 1, wherein workpiece on upper insulated cover is added a guard for preventing electric field affection, and avoiding top of workpiece being electrolyzed and polished.

12. The electropolishing process means for inner and outer surfaces of a metal as claimed in claim 1, wherein the means is put in an electrolytic tank for electropolishing process reaction.

13. The electropolishing process means for inner and outer surfaces of a metal as claimed in claim 12, wherein the electrolytic tank has a heater and a meshed plate; heater is to heat and also has thermal insulation function, the meshed plate is to averagely distribute electrolyte flow from bottom to upper place of tank.

14. The electropolishing process means for inner and outer surfaces of a metal as claimed in claim 12, wherein the electrolytic tank has a partition, electrolyte overflows to a temporary electrolyte storing area when electrolyte amount is more than tank capacity.

15. The electropolishing process means for inner and outer surfaces of a metal as claimed in claim 12, wherein a pump cooperate with a pipe to recycle electrolyte, which is pumped out and in from electrolytic tank bottom.

16. The electropolishing process means for inner and outer surfaces of a metal as claimed in claim 15, wherein the pump is made of anti-acid material.

17. The electropolishing process means for inner and outer surfaces of a metal as claimed in claim 1, wherein an over-hanging beam and a revolving stage connect the means.

18. The electropolishing process means for inner and outer surfaces of a metal as claimed in claim 17, wherein the revolving stage has a plurality of tanks.

19. The electropolishing process means for inner and outer surfaces of a metal as claimed in claim 18, wherein the plural tanks include plural electrolytic polishing tanks, plural water rinse tanks, one nitric acid rinse tank, one deionization hot water rinse tank and one drying tank.

20. The electropolishing process means for inner and outer surfaces of a metal as claimed in claim 17, wherein over-handing beam is a cam mechanism to shake for reducing air bulbs when reaction being proceeded.

* * * * *